United States Patent
Cichocki et al.

(10) Patent No.: US 12,264,985 B1
(45) Date of Patent: Apr. 1, 2025

(12) United States Patent

(54) VALVE TESTER

(71) Applicant: EFC Systems, Inc., Havre de Grace, MD (US)

(72) Inventors: Joseph P. Cichocki, Newark, DE (US); Kevin Dennis Luckey, Lancaster, PA (US)

(73) Assignee: EFC SYSTEMS, INC., Havre de Grace, MD (US)

( * ) Notice: Subject to any disclaimer, the term of this patent is extended or adjusted under 35 U.S.C. 154(b) by 0 days.

(21) Appl. No.: 18/623,668

(22) Filed: Apr. 1, 2024

(51) Int. Cl.
*G01M 13/003* (2019.01)
*F16K 37/00* (2006.01)

(52) U.S. Cl.
CPC ....... *G01M 13/003* (2019.01); *F16K 37/0083* (2013.01)

(58) Field of Classification Search
CPC .................................................. G01M 13/003
See application file for complete search history.

(56) References Cited

U.S. PATENT DOCUMENTS

| | | | | |
|---|---|---|---|---|
| 2013/0008536 A1* | 1/2013 | Wrobel | .................. | E04F 21/12 |
| | | | | 137/565.01 |
| 2016/0334029 A1* | 11/2016 | French | ................ | F16K 31/1262 |
| 2020/0131927 A1* | 4/2020 | Tolmatsky | .......... | F16K 37/0083 |
| 2020/0355295 A1* | 11/2020 | Flandin | ............... | G01M 13/003 |
| 2022/0018732 A1* | 1/2022 | Fontaine | ................ | G01N 19/02 |
| 2023/0180683 A1* | 6/2023 | Woytowitz | .............. | B05B 3/021 |
| | | | | 239/1 |
| 2023/0381829 A1* | 11/2023 | Trinkle | ................... | B08B 3/026 |

* cited by examiner

*Primary Examiner* — Paul M. West
*Assistant Examiner* — Mark A Shabman
(74) *Attorney, Agent, or Firm* — Panitch Schwarze Belisario & Nadel LLP

(57) ABSTRACT

A method for testing a rotary atomizer valve using a system having a test device housing, a linear potentiometer including a resistive circuit and a movable shaft, and a controller includes, (a) with the shaft contacting a movable surface of the valve, obtaining a first reference data point representing a first position of the movable surface, (b) commanding an actuator to displace the movable surface in a first direction, (c) obtaining a first current data point representing a second position of the movable surface, (d) determining whether the second position equals the first position, (e) if not, setting the first current data point as the first reference data point and repeating steps (c) and (d), and (f) if so, recording the second position as a first end point of the valve.

11 Claims, 7 Drawing Sheets

VALVE TESTER

BACKGROUND

Embodiments described herein relate generally to valve testing, and more particularly, to systems and methods for testing valves provided in a rotary atomizer.

Rotary bell cup atomizers are used to apply paint to workpieces, more particularly, they may be used to paint automobile and other vehicle bodies. Known rotary atomizers generally include a rotating bell cup that disperses liquid or powdered paint onto a surface. The bell cup is generally mounted for rotation on an outer shroud housing a motor assembly. The outer shroud may be connected to a manifold assembly that provides electrical, pneumatic, and/or other connections for operating the motor assembly and bell cup, as well as connections for supplies of paint, cleaning fluid, or other materials to be dispersed by the bell cup or otherwise passed into and/or out of the outer shroud.

The manifold assembly will often include one or more valves for controlling fluid flow, such as paint, cleaning fluid, air, or the like. It is therefore important that the valves function properly so that operation of the rotary atomizer is not impeded. But with extended usage and aging, the valves may not open or close fully (or at all) or operate more slowly. This is of particular concern for valves that come into materials subject to drying, such as paint or the like, because such materials may clog the fluid path, jam the valve, or create other adverse conditions to cause valve malfunction.

It is therefore desirable to provide a simple and efficient system and method for periodic testing of valves to ensure proper operation of the rotary atomizer.

BRIEF SUMMARY

Briefly stated, one embodiment comprises a method for testing a valve of a rotary atomizer using a system having a test device housing, a linear potentiometer at least partially disposed within the test device housing and including a resistive circuit operably coupled to a shaft that is movable with respect to the test device housing, and a controller operably connected to the linear potentiometer. The valve has a movable surface and is connected to an actuator. The method includes, (a) with the shaft of the linear potentiometer contacting the movable surface of the valve, obtaining, by the controller from the linear potentiometer, a first reference data point representing a first position of the movable surface of the valve, (b) commanding, by the controller, the actuator to displace the movable surface of the valve in a first direction, (c) obtaining, by the controller from the linear potentiometer, a first current data point representing a second position of the movable surface of the valve, (d) determining, by the controller, whether the second position is equal to the first position, (e) if the second position is not equal to the first position, setting, by the controller, the first current data point as the first reference data point and repeating steps (c) and (d); and (f) if the second position is equal to the first position, recording, by the controller, the second position as a first end point of the valve.

In one aspect, the method further includes (g) with the shaft of the linear potentiometer contacting the movable surface of the valve, obtaining, by the controller from the linear potentiometer, a second reference data point representing a third position of the movable surface of the valve, (h) commanding, by the controller, the actuator to deactivate to allow the movable surface of the valve to displace in a second direction opposite to the first direction, (i) obtaining, by the controller from the linear potentiometer, a second current data point representing a fourth position of the movable surface of the valve, (j) determining, by the controller, whether the fourth position is equal to the third position, (k) if the fourth position is not equal to the third position, setting, by the controller, the second current data point as the second reference data point and repeating steps (i) and (j), and (l) if the fourth position is equal to the third position, recording, by the controller, the fourth position as a second end point of the valve.

In a further aspect, steps (a)-(l) are repeated a predetermined number of times. The first and second end points of the valve are incremented with the second and fourth positions, respectively, at each iteration. In a still further aspect, after the predetermined number of times has been completed, the first and second end points of the valve are each divided by the predetermined number of times to determine an average for the first end point and an average for the second end point.

In yet a further aspect, step (e) further includes increasing a first timer and step (k) further includes increasing a second timer. In a still further aspect, step (f) further includes reading, by the controller, a final value of the first timer and determining a duration for complete travel of the movable surface of the valve in the first direction and step (l) further includes reading, by the controller, a final value of the second timer and determining a duration for complete travel of the movable surface of the valve in the second direction.

In another aspect, step (e) further includes increasing a first timer. In a still further aspect, step (f) further includes reading, by the controller, a final value of the timer and determining a duration for complete travel of the movable surface of the valve in the first direction.

In yet another aspect, the controller is located remotely from the test device housing.

In still another aspect, prior to step (a), the controller receives a signal that a button on the test device housing has been actuated.

In yet another aspect, the method further includes outputting, by the controller, the first end point of the valve on a display.

Another embodiment comprises a system for testing a valve of a rotary atomizer. The system includes a test device housing including at least one alignment feature and a linear potentiometer at least partially disposed within the test device housing. The linear potentiometer includes a resistive circuit operably coupled to a shaft that is movable with respect to the test device housing. The at least one alignment feature is configured to enable alignment of the shaft with a movable surface of the valve. A controller is operably connected to the linear potentiometer and connectable to an actuator for the valve. The controller is configured to command the actuator to displace the movable surface of the valve in at least one direction and to receive position data from the linear potentiometer corresponding to measured positions of the movable surface of the valve while the movable surface is moving in the at least one direction.

In one aspect, the controller is located remotely from the test device housing. In a further aspect, a cable is connected to the resistive circuit within the test device housing. The cable is configured to enable the position data to be transmitted from the resistive circuit to the controller.

In another aspect, the alignment feature is a cavity formed by the test device housing. In a still further aspect, the cavity is shaped to match an external shape of a head of the valve.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Figure 1:
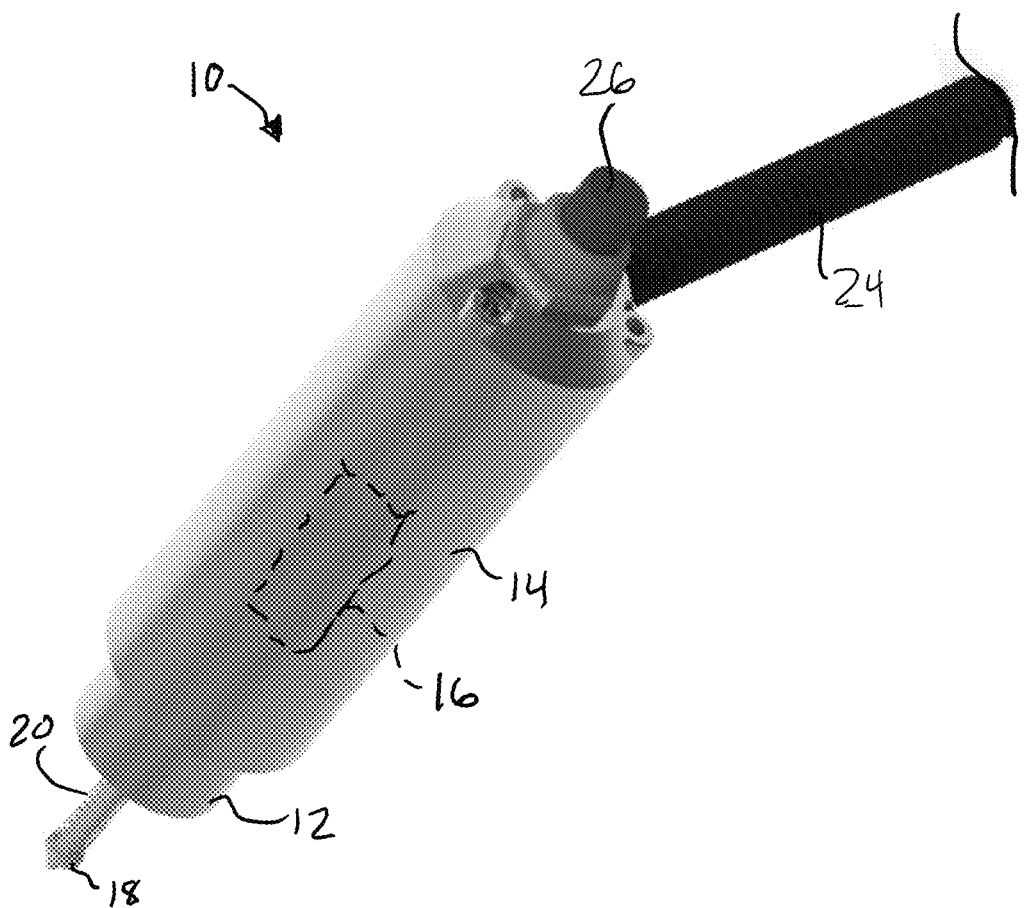
FIG. 1 is a top side perspective view of a valve tester in accordance with a first example embodiment.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
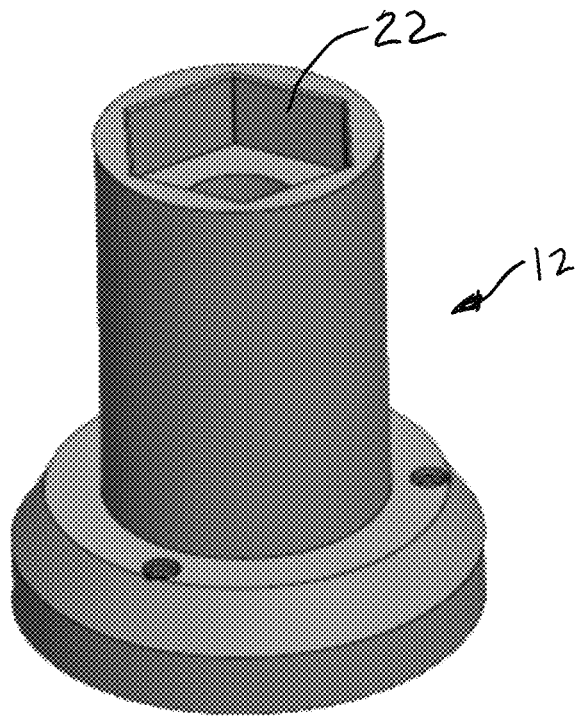
FIG. 2 is a bottom side perspective view of a bottom shell of the valve tester shown in FIG. 1.
Figure 3:
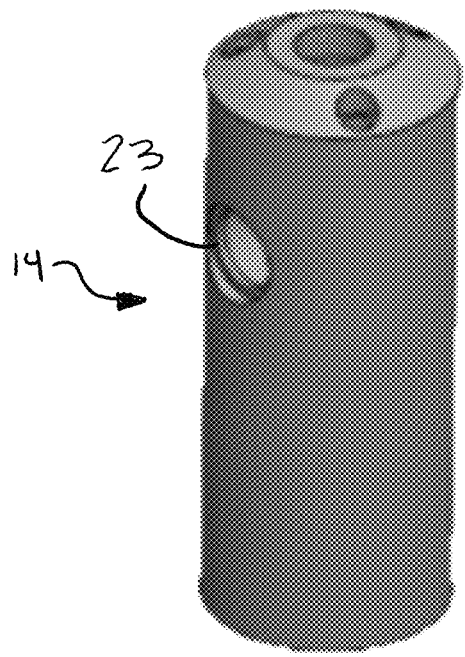
FIG. 3 is a top side perspective view of a top shell of the valve tester shown in FIG. 1.
Figure 4A:
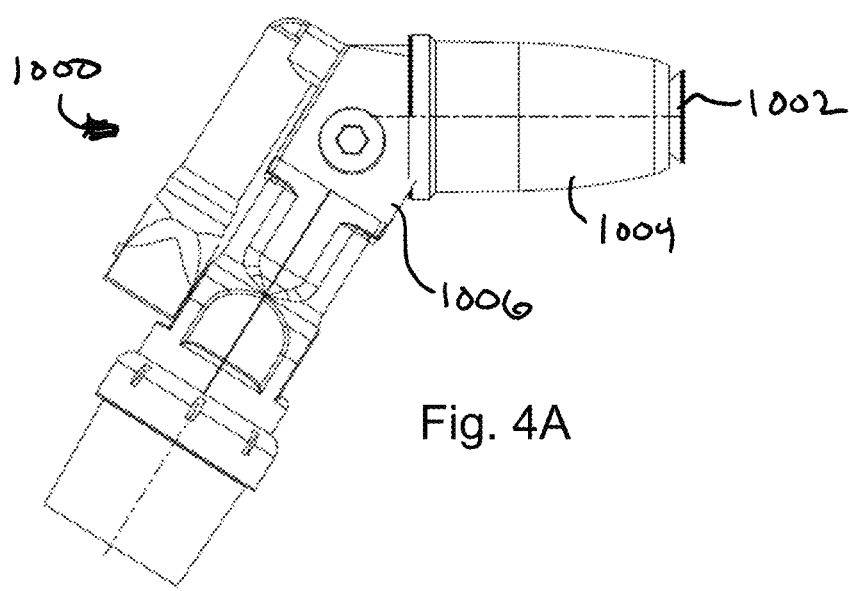
FIG. 4A is a right side elevational view of an example rotary atomizer with which the valve tester described herein may be used.
Figure 4B:
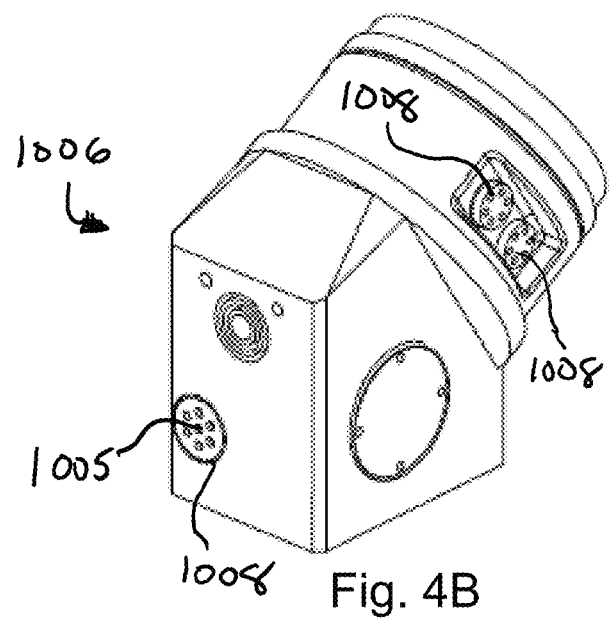
FIG. 4B is a top, right side perspective view of a manifold assembly of the rotary atomizer of FIG. 4A.
Figure 4C:
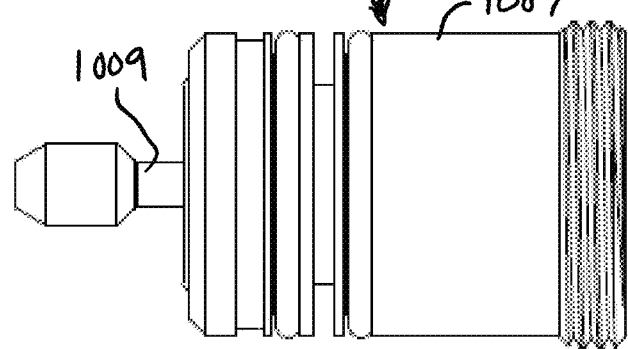
FIG. 4C is a side elevational view of an example valve of the rotary atomizer of FIG. 4A that may be tested using the valve tester described herein.

Referring to FIGS. 1-3, there is shown a first example embodiment of a valve tester 10 in accordance with the present invention, in particular for use in testing valve operation in a rotary atomizer 1000 (FIG. 4A). In the example rotary atomizer 1000 shown in FIG. 4A, a bell cup 1002 is mounted for rotation within an outer shroud 1004 that is coupled to a manifold assembly 1006. The manifold assembly 1006 may be coupled, directly or indirectly, to a robot or other system (not shown) that provides a supply of power, air, paint, washing fluid, and/or other materials for operating the rotary atomizer 1000, and which may move the rotary atomizer 1000 to desired locations. As shown in FIG. 4B, the manifold assembly 1006 may include a plurality of valves 1008 installed therein (although valves may be provided in other components of the rotary atomizer 1000 alternatively or additionally). Referring to FIGS. 4B-4C, the valves 1008 typically include a piston 1009 configured to retract into a valve body 1007 upon a triggering condition (e.g., pneumatic actuation, electric actuation, hydraulic actuation, or the like), which moves the piston 1009 out of a seat (not shown) within the manifold assembly 1006 to allow fluid to pass. Movement of the piston 1009 also coincides with corresponding movement of an indicator pin 1005 observable through a pin opening of the valve 1008.

Returning to FIGS. 1-3, the valve tester 10 in the illustrated example includes a housing which may be formed by two shells, a bottom shell 12 and a top shell 14, which may be connected to one another using mechanical fasteners (e.g., bolts, screws, or the like), threading, adhesives, welding, combinations thereof, or the like. However, in alternative embodiments, the housing may be of a single unitary construction or be formed of more than two shells. The bottom and top shells 12, 14 may be made from acetal copolymer, although other types of polymeric or ceramic material may be used as well. In addition, various components of the housing, such as the bottom and top shells 12, 14 may each be made from different material from each other, where desired.

The valve tester 10 may include a distance measuring device for detecting a state of a valve, such as one or more of the valves 1008 in FIG. 4B. In the example shown in FIG. 1, the distance measuring device may be a linear potentiometer that is at least partially disposed within the housing 12, 14 and includes a resistive circuit 16 operably coupled to a shaft 18 that is movable with respect to the housing. The shaft 18 may be configured to alter the voltage output by the resistive circuit 16 depending on compression distance by the shaft 18. In some embodiments, the shaft 18 may be disposed entirely within the housing of the valve tester 10. In other embodiments, at least a portion of the shaft 18 may extend outside of the bottom shell 12. A spring 20 may be provided to bias the shaft 18 to a fully extended position with respect to the resistive circuit 16. In the example shown in FIG. 1, the spring 20 concentrically surrounds the shaft 18 at least partially along its length, although other configurations may be used as well. In the example shown in FIG. 1, the shaft 18 may travel a maximum of about 5 mm under compression, although other maximum distances may be used as well, depending on the characteristics of the valve 1008 to be measured. The resistive circuit 16 may include a 3Ω variable resistor (although other resistances may be utilized) and may be provided with a supply voltage (e.g., 0-24 VDC for a unit equipped on a test bench (not shown), 0-5 Volts for a handheld unit, or the like).

Figure 5:
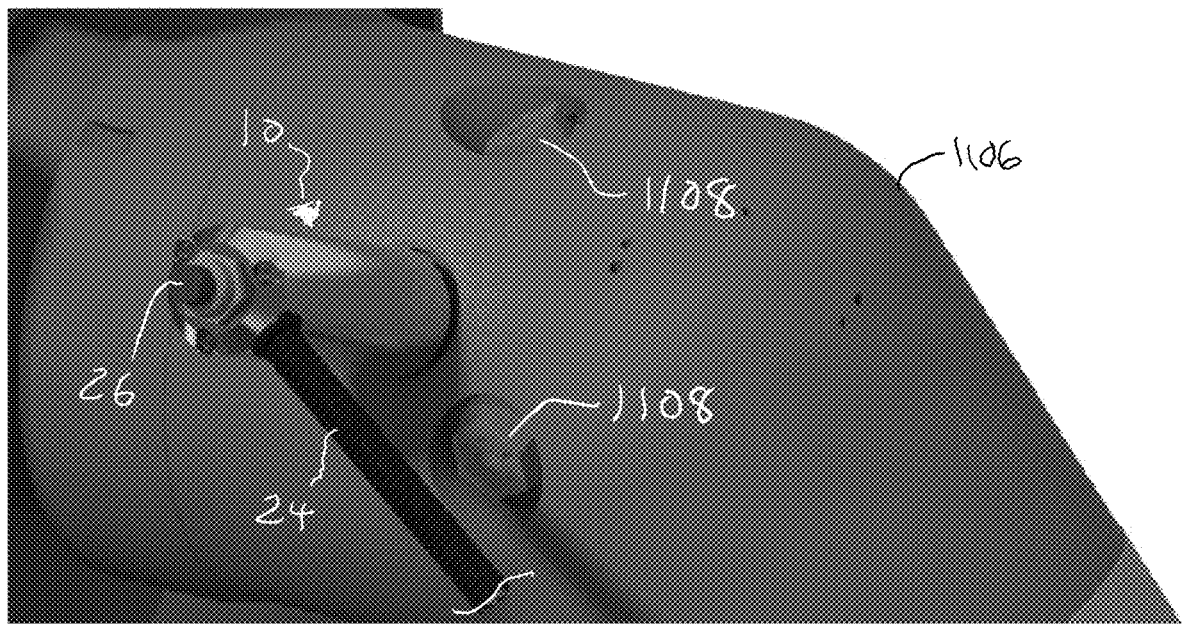
FIG. 5 is a partial, top, left side perspective view of the valve tester of FIG. 1 in use with a rotary atomizer.

In use, the shaft 18 of the valve tester 10 may be brought into contact with the indicator pin or other movable surface related to the valve 1008 that would transfer movement of the valve piston 1009 to the shaft 18 and enable the potentiometer in the valve tester 10 to determine a current state of the valve 1008, as will be described in further detail below. To aid in properly aligning the shaft 18 with the indicator pin or other movable surface, the valve tester 10 may include one or more alignment features 22. Specifically referring to FIG. 2, the bottom shell 12 in this example has formed therein an alignment feature 22, which is a hexagonal cavity, which matches a hexagonal external head shape of valves 1108 shown in the manifold assembly 1106 in FIG. 5. Although the example shown in FIG. 2 uses a hexagonal shape, the cavity may be shaped to match the external shape of a head of a valve to be tested. Alternatively, other alignment features 22 may utilized including differently shaped cavities or surfaces, pins or other protruding surfaces, combinations thereof, or the like.

Although in the example described herein the valve tester 10 is shown utilizing a linear potentiometer for the purpose of detecting valve position, other types of devices may be used to obtain the necessary data, such as a range finder (e.g., LiDAR, RADAR, time of flight sensor, or the like), an optical detector (e.g., a camera or the like), a magnetic encoder, inductive distance sensor, or the like.

A cable 24 may be provided that can connect the valve tester 10 to a controller or other computer, power supply, combinations thereof, or the like, such as in the example in FIG. 6, described in further detail below. The cable 24 may contain multiple wires (not shown) that may be used to communicate input and output voltages between the resistive circuit 16 and a power supply and/or controller, and for supplying power and/or other electrical signals to and/or from other electronic components (not shown) within the valve tester 10. However, in some embodiments, at least some communication with the valve tester 10 may occur over a wireless interface (not shown). The cable 24 may extend into the valve tester 10 via an opening 23 through the housing, such as the top shell 14, although openings may be provided elsewhere on the valve tester 10.

In some embodiments, the valve tester 10 may be battery-operated, and may incorporate a rechargeable battery (e.g., LiPo, Li-ion, or the like), alkaline battery, or the like. In battery-operated embodiments where data is communicated to and from the valve tester 10 wirelessly, the cable 24 may be omitted.

The valve tester 10 may also include at least one actuation button 26, operation of which will be described in further detail below. However, other user interfaces may be provided in addition or alternatively to the button 26, such as a keypad, touchpad, touchscreen, combinations thereof, or the like. The valve tester 10 may include a display (not shown) to provide test data, operational status, and/or other information to the user during operation.

Figure 6:
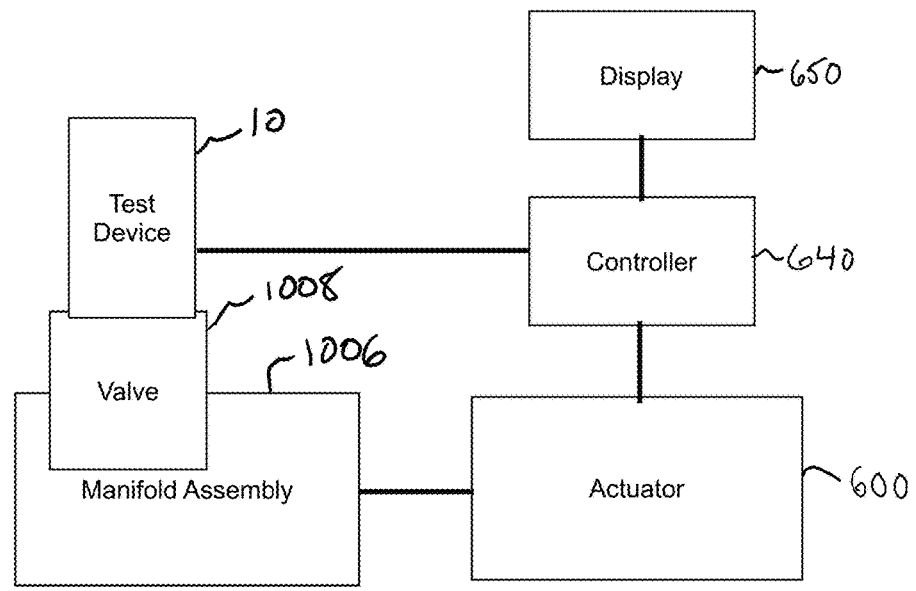
FIG. 6 is a schematic block diagram of an example system for testing a valve of a manifold assembly of a rotary atomizer.

FIG. 6 shows an example system architecture for testing a valve 1008 using the valve tester 10. The manifold 1006 (or other rotary atomizer component) housing the valve 1008 for testing may be connected to an actuator 600, which may be part of a test bench or other dedicated testing device, or may be part of a robot or other device to which the manifold assembly 1006 is connected for working in the field—i.e., testing may be performed in situ under certain circumstances. At minimum, the actuator 600 may provide pneumatic, electrical, hydraulic, and/or other signals to the manifold assembly 1006 to operate the valve 1008 on command.

A controller 640 may be provided for operating the valve tester 10, as well as the actuator 600, if necessary. The controller 640 may be a programmable logic controller (PLC), but may also be a microcontroller unit (MCU), a central processing unit (CPU), a microprocessor, an application specific controller (ASIC), a programmable logic array (PLA), combinations thereof, or the like. The controller 640 may include or be coupled to a memory (not shown) that may store code or software for carrying out processes described herein and/or carrying out other operations and may store data for later analysis or transfer to remote or external devices. It should be further appreciated that although the controller 640 in the example of FIG. 6 is a single component, the controller 640 may include a plurality of individual devices, with control functions divided among the individual devices. In some embodiments, the controller 640 may be housed within the valve tester 10 or the actuator 600, while in other embodiments, the controller 640 may be housed remotely from both components, such as in a test bench, an external computer, a handheld device, or the like. When housed separately, the controller 640 may communicate with the valve tester 10 via one or more wires in the cable 24 or wirelessly, and may communicate with the actuator 600 via a wired or wireless connection. In addition, separate controllers may be provided for each of the valve tester 10 and the actuator 600, which may be in communication with each other to coordinate for testing.

The controller 640 may also be in communication with a display 650 for outputting test results to the user, among other functions. The display 650 may be a touchscreen to serve as a user interface with the controller 640, although separate interfaces may be provided in addition to or instead of a touchscreen, such as a keyboard, mouse, touchpad, buttons, dials, combinations thereof, or the like. The display 650 may be provided on the valve tester 10, on the actuator 600, or be housed with any other component within the system, or may be provided separately for wired or wireless communication with the controller 640.

Figure 7:
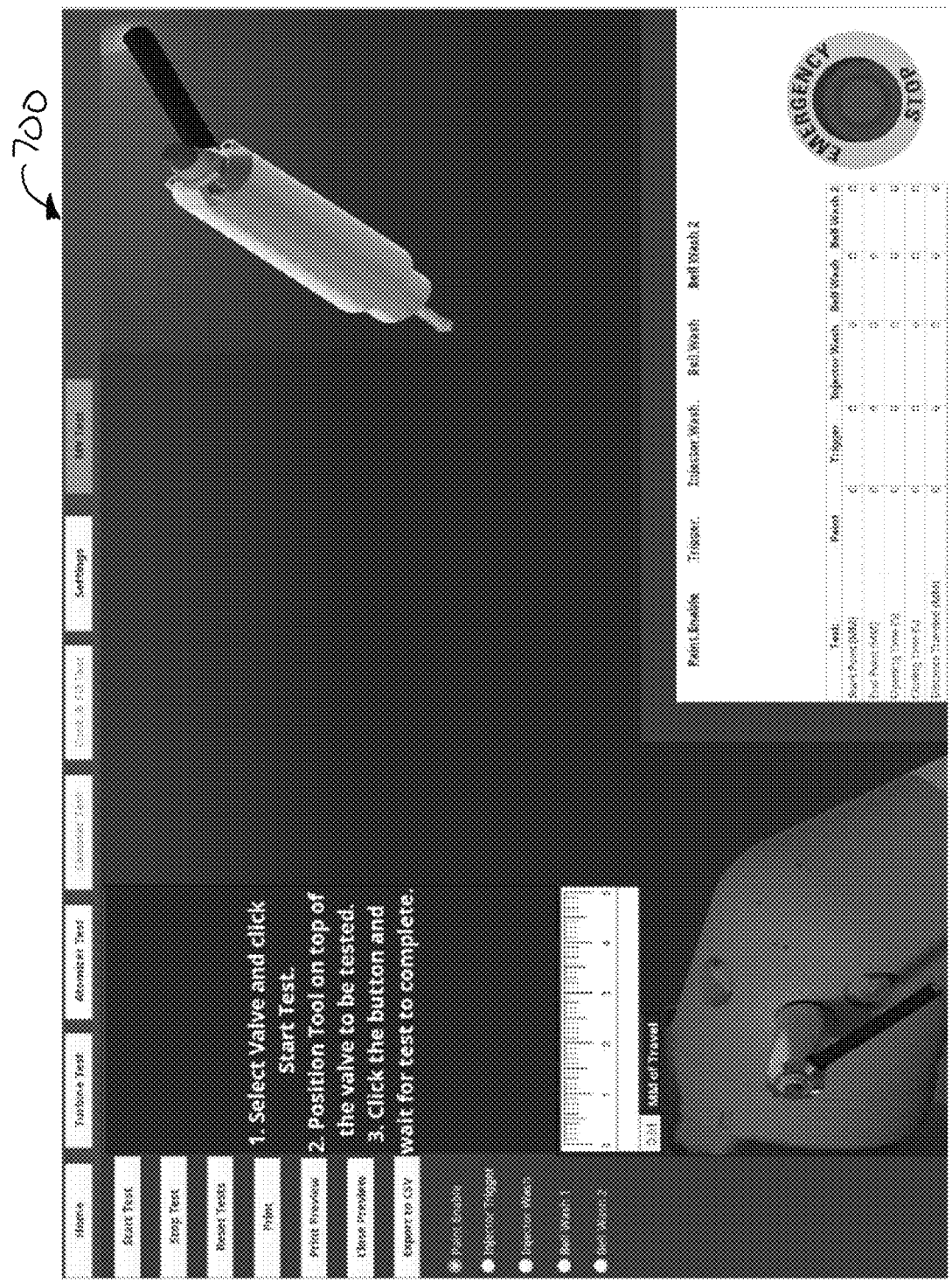
FIG. 7 is a screenshot of an example testing program for use in connection with a valve tester described herein.

FIG. 7 shows an example screenshot 700 from an example testing program that can be provided on the display 650 and operated by the controller 640. The program may offer options for starting a test, stopping a test, resetting a test, printing or exporting test results or the like. The program may further offer the ability to select different valves for testing, onscreen instructions (text and/or pictorial), test results (including, for example, starting and end point readings, opening and closing times, distance travelled, or the like), an emergency stop function, and/or other like control capabilities or data that may be of interest. Although the screenshot 700 shows much of this information and operational options on the display 650 simultaneously, the options and data may be spread across multiple screens which may be navigable using a user interface or the like.

Figure 8A:
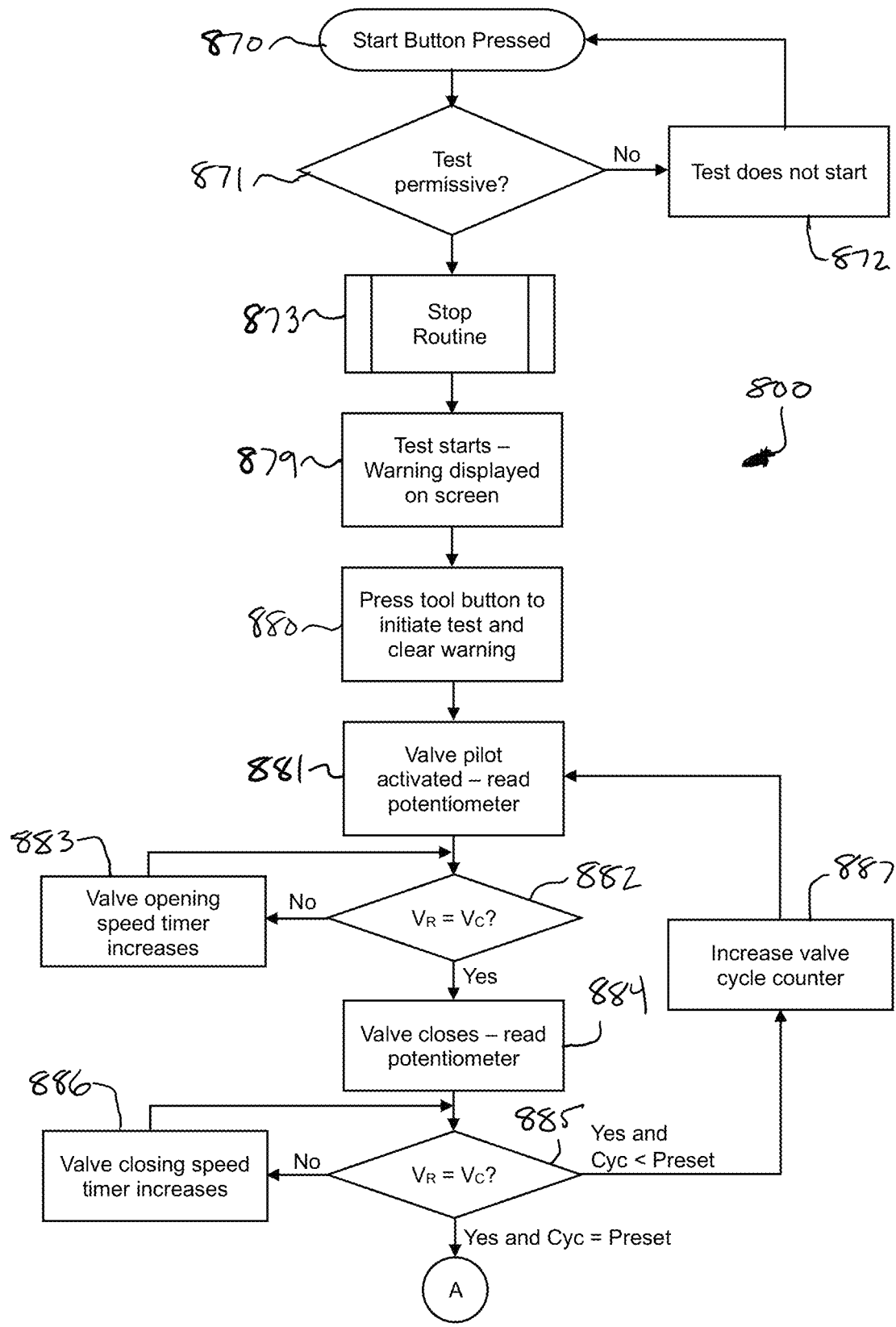
FIGS. 8A-8C provide a flow chart illustrating an example method performed by a controller for testing a valve with a valve tester described herein.
Figure 8B:
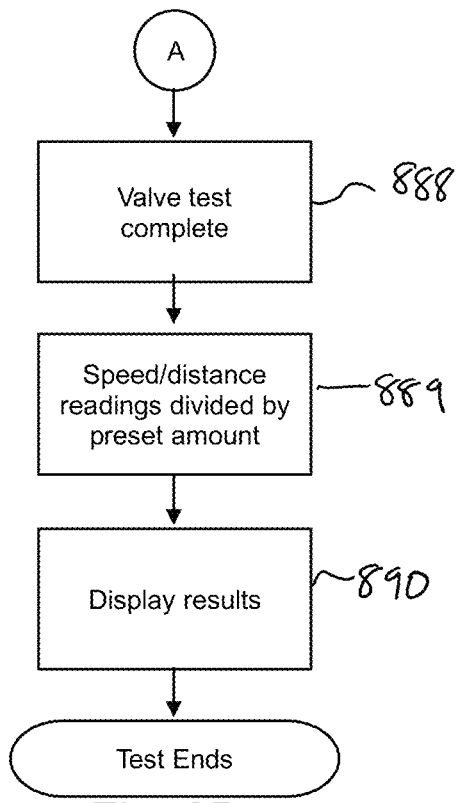

An example testing operation 800 using the valve tester 10 will now be described with reference to FIGS. 8A-8C. At step 870 the test may be initiated, for example, by pressing a start button, such as the "Start Test" button on the screen 700 shown in FIG. 7 or elsewhere within the system. At step 871, the controller 640 may check to determine whether testing is permitted, such as by checking various operational conditions (e.g., the controller 640 does not detect the valve tester 10, certain settings are unselected or inactive, there is no power to the actuator 600, and the like), or the like. If testing is not permitted, at step 872, the controller 640 may cancel the test and await re-initiation at step 870. If testing is permitted, the controller 640 may continue on.

Figure 8C:
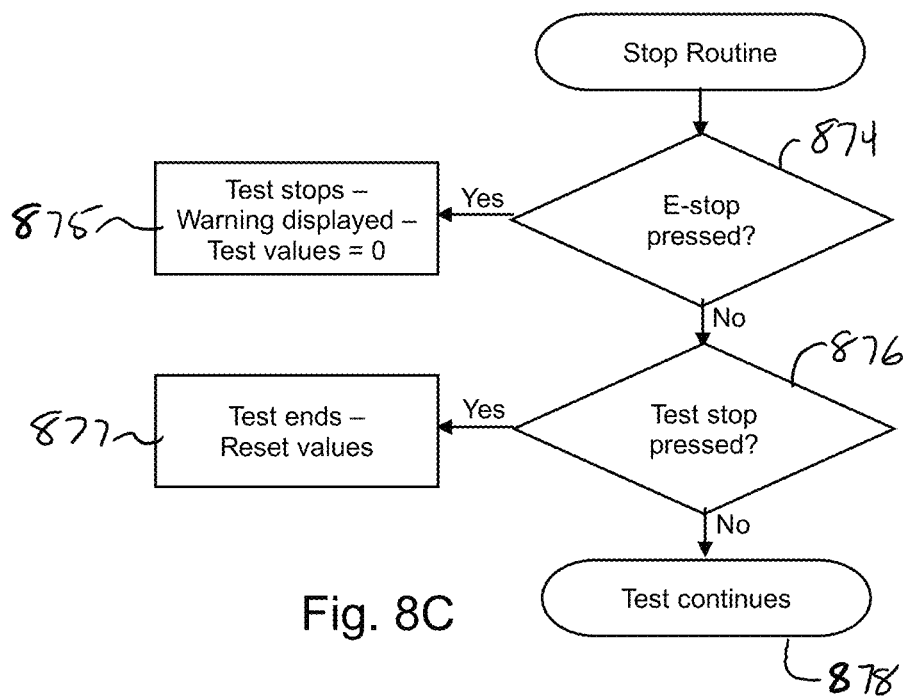

A step 873 may be provided which invokes a stop routine, which is depicted in further detail in FIG. 8C. Upon entering the stop routine, the controller 640 may check whether the emergency stop has been actuated at step 874. If so, at step 875 the controller 640 may end the test, provide a warning on the display 650 or using other methods (e.g., audible alert, tactile alert, combinations thereof, or the like), and/or reset all test values to zero. If the emergency stop has not been actuated, the controller 640 may continue to step 876 to check whether the test has been stopped via, for example, the stop button on screen 700 in FIG. 7. If so, at step 877, the controller 640 may end the test and/or reset all test values. Otherwise, the controller 640 may, at step 878, return to the main routine.

At step 879, the controller 640 may begin the test, which may include providing a warning to the user, via the display 650 or the like. The warning may be provided to alert the user that further action is required to begin. For example, the user may be instructed to press the actuation button 26 on the valve tester 10 to initiate test operations. At step 880, the controller 640 may receive a signal that the actuation button 26 has been pressed and may clear the warning as well as begin the subsequent steps for valve testing.

At step 881, with the shaft 18 contacting the movable surface of the valve 1008 under test, the controller 640 may initiate displacement of the movable surface of the valve 1008 in a first direction (opening the valve 1008, in this example), such as by activating a valve pilot using air or another activation signal (e.g., electric, hydraulic, or the like). The controller 640 may further read the potentiometer to obtain a reference data point, such as a reference voltage $V_R$ that signifies the position of the valve at t=0. It should be noted that although the reference voltage $V_R$ is described above as being acquired substantially simultaneously with actuation of the valve pilot, the initial reference voltage $V_R$ value may be acquired in advance, including prior to other steps shown in FIG. 8A. At step 882, the controller 640 may read the potentiometer again after a predetermined time period (which may be on the order of milliseconds, microseconds, or the like, although where a simple "open" result is sufficient, the period may take longer) to obtain a current data point, such as a current voltage $V_C$ representing the current position of the valve 1008. The controller 640 may evaluate whether the current and previously measured positions of the valve 1008 match, such as by comparing whether current voltage $V_C$ is equal to the reference voltage $V_R$. If this condition is not satisfied, at step 883, the controller 640 may overwrite the previous reference voltage $V_R$ value with the new measurement (e.g., $V_C$) and allow a valve opening speed timer, which may be used to time how long the valve takes to open, to increase. Step 882 may then be repeated until the $V_R=V_C$ condition is met, which indicates that the valve 1008 has completed its travel. The valve opening speed timer may be read for a final value and the current voltage $V_C$ (or equivalent data value) may be recorded to indicate the final "open" position of the valve 1008.

The controller 640 may then move to step 884, wherein the valve pilot (or other signal) may be deactivated to allow displacement of the movable surface of the valve 1008 in a second direction (closing, in this example). With the shaft 18 contacting the movable surface of the valve 1008, the controller 640 may read the potentiometer to obtain a reference data point (in this example reference voltage $V_R$) that signifies the position of the valve at t=0 for measuring the closing operation. However, the reference voltage $V_R$ may instead be the final value recorded from the opening operation measurement. At step 885, the controller 640 may read the potentiometer again after a predetermined time period (which may be on the order of milliseconds, microseconds, or the like, although where a simple "closed" result is sufficient, the period may take longer) to obtain a current data point, such as current voltage $V_C$ representing the current position of the valve 1008. The controller 640 may evaluate whether the current voltage $V_C$ is equal to the reference voltage $V_R$. If this condition is not satisfied, at step 886, the controller 640 may overwrite the previous reference voltage $V_R$ value with the new measurement (e.g., $V_C$) and allow a valve closing speed timer, which may be used to time how long the valve takes to close, to increase. Step 885 may then be repeated until the $V_R=V_C$ condition is met, which indicates that the valve 1008 has completed its travel. The valve closing speed timer may be read for a final value and the current voltage $V_C$ (or equivalent data value) may be stored to indicate the final "closed" position of the valve 1008.

When $V_R=V_C$, the controller 640 may also check whether a cycle count Cyc is equal to a preset number or not. In certain embodiments, the controller 640 may open and close the valve 1008 multiple times to obtain more accurate test data and account for any potential anomalies during a single test. If the cycle count Cyc is below the preset number, the controller 640 may proceed to step 887, wherein the controller 640 may increment the cycle counter and return to step 881 to initiate another series of open/close testing. However, in other embodiments, the controller 640 may prompt the user as to whether to manually initiate another test cycle instead of automating the process. If the cycle count Cyc matches the preset number (or if the user confirms no further testing is required), the controller 640 may move to step 888 and complete the test.

At step 889, if multiple tests have been conducted, the speed and distance readings obtained for the opening and closing operations may respectively be aggregated and divided by the preset cycle count to obtain average values for each. At step 890, the controller 640 may output the results for display, such as on display 650, although the results may be output in other forms as well.

Although the example given above requires active opening of the valve and passive closing of the valve (e.g., through the bias of the spring), there may be instances where the converse is true, i.e., the valve may be normally open and require pneumatic or other actuation to initiate closing, with deactivation allowing the valve to return to an open state. There may also be valves in bistable form, which require actuation in both directions. The system described herein may be used to assess the valve in any of these scenarios.

While the example testing operation included testing both opening and closing positions and speeds, any of the parameters discussed above may be tested alone or in combination with others. For example, the testing operation may only test for open positions and/or distances travelled, closed positions and/or distances travelled, for speed only, or other like combinations, as desired.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined herein.

We claim:

1. A method for testing a valve of a rotary atomizer using a system having a test device housing, a linear potentiometer at least partially disposed within the test device housing and including a resistive circuit operably coupled to a shaft that is movable with respect to the test device housing, and a controller operably connected to the linear potentiometer, the valve having a movable surface and being connected to an actuator, the method comprising:
   (a) with the shaft of the linear potentiometer contacting the movable surface of the valve, obtaining, by the controller from the linear potentiometer, a first reference data point representing a first position of the movable surface of the valve;
   (b) commanding, by the controller, the actuator to displace the movable surface of the valve in a first direction;
   (c) obtaining, by the controller from the linear potentiometer, a first current data point representing a second position of the movable surface of the valve;
   (d) determining, by the controller, whether the second position is equal to the first position;
   (e) if the second position is not equal to the first position, setting, by the controller, the first current data point as the first reference data point and repeating steps (c) and (d); and
   (f) if the second position is equal to the first position, recording, by the controller, the second position as a first end point reading of the valve.

2. The method of claim 1, further comprising:
   (g) with the shaft of the linear potentiometer contacting the movable surface of the valve, obtaining, by the controller from the linear potentiometer, a second reference data point representing a third position of the movable surface of the valve;
   (h) commanding, by the controller, the actuator to deactivate to allow the movable surface of the valve to displace in a second direction opposite to the first direction;
   (i) obtaining, by the controller from the linear potentiometer, a second current data point representing a fourth position of the movable surface of the valve;
   (j) determining, by the controller, whether the fourth position is equal to the third position;
   (k) if the fourth position is not equal to the third position, setting, by the controller, the second current data point as the second reference data point and repeating steps (i) and (j); and
   (l) if the fourth position is equal to the third position, recording, by the controller, the fourth position as a second end point reading of the valve.

3. The method of claim 2, wherein steps (a)-(l) are repeated a predetermined number of times, the first and second end point readings of the valve being incremented with the second and fourth positions, respectively, at each iteration.

4. The method of claim 3, wherein after the predetermined number of times has been completed, the first and second end point readings of the valve are each divided by the predetermined number of times to determine an average for the first end point reading and an average for the second end point reading.

5. The method of claim 2, wherein step (b) further includes starting a first timer to determine a duration for complete travel of the movable surface of the valve in the first direction, step (e) further includes allowing the first timer to continue running, step (h) further includes starting a second timer to determine a duration for complete travel of the movable surface of the valve in the second direction, and step (k) further includes allowing the second timer to continue running.

6. The method of claim 5, wherein step (f) further includes reading, by the controller, a final value of the first timer and determining the duration for complete travel of the movable surface of the valve in the first direction and step (l) further includes reading, by the controller, a final value of the second timer and determining the duration for complete travel of the movable surface of the valve in the second direction.

7. The method of claim 1, wherein step (b) further includes starting a first timer to determine a duration for complete travel of the movable surface of the valve in the first direction, step (e) further includes allowing the first timer to continue running.

8. The method of claim 7, wherein step (f) further includes reading, by the controller, a final value of the first timer and determining the duration for complete travel of the movable surface of the valve in the first direction.

9. The method of claim 1, wherein the controller is located remotely from the test device housing.

10. The method of claim 1, wherein prior to step (a), the controller receives a signal that a button on the test device housing has been actuated.

11. The method of claim 1, further comprising outputting, by the controller, the first end point reading of the valve on a display.

* * * * *